UNITED STATES PATENT OFFICE.

BERNARD MOEBIUS, OF CHIHUAHUA, MEXICO.

PROCESS FOR THE SEPARATION OF METALS.

SPECIFICATION forming part of Letters Patent No. 310,302, dated January 6, 1885.

Application filed July 22, 1884. (No specimens.)

*To all whom it may concern:*

Be it known that I, BERNARD MOEBIUS, a citizen of Germany, residing at Chihuahua, Mexico, have invented certain new and useful Improvements in Processes for the Separation of Metals, of which the following is a description.

This invention relates to a process of refining silver and gold and separating them from platinum, copper, lead, antimony, and other metal.

The invention consists of an electrolytic process, in which the silver to be refined, forming the anode in a bath of nitrate of silver, nitrate of copper, and nitric acid, is dissolved by an electric current and precipitated at the cathode, leaving the copper in solution, and gold, platinum, and lead, as peroxide of lead, at the anode.

The invention further consists in separating the gold from the metals left at the anodes by dissolving it by means of a mixture of bromine and hydrobromic acid and precipitating it by bromide of iron.

My invention also consists in further features of improvement, as will be hereinafter more fully described, and pointed out in the claims.

To carry out my improved process, I prefer to use an apparatus described in my application for a patent filed February 5, 1884, No. 119,871, to which I refer for a more full understanding of my invention.

The process is as follows: The base bullion, cast in plates of a desired form, is used as anodes. As cathodes I use silver-coated copper plates, which give nearly the same result as silver plates, but are by far not so expensive as these. Pure copper cathodes are not advisable, as they will destroy the exciting-liquid in precipitating by simple immersion the silver contained therein. The exciting-liquid employed (consisting of a solution of nitrate of silver, nitrate of copper, and nitric acid) may be formed in the battery, if dilute nitric acid is used in the first instance, which dissolves the silver and copper contained in the silver to be refined. The obtaining of the right solution can be accelerated when the electrodes are so arranged that the cathodes dip only a little in the exciting-liquid, whereby more silver will be dissolved than precipitated at the cathode. The presence of copper in solution is necessary to insure the precipitation of all the lead as peroxide at the anode. Oil is rubbed on the cathodes to prevent an adhesion of silver. The current, which must be of a small electro-motive force, (from one to three volts per cell,) dissolves the silver and precipitates it at the cathode in a loose spongy state, or in a crystalline shape, according to the concentration of the solution and density of the current. The silver drops from the cathode to the bottom of the receptacle. The copper is dissolved also; but as it is less electro-negative it remains in solution, provided the exciting-liquid is not too poor in silver and too rich in copper; but even then, if some copper should be precipitated with the silver, it would be removed with the same from the cathodes, and as it comes in contact in the bottom of the tank with the silver solution it would redissolve in precipitating its equivalent of silver. The lead, as peroxide, as well as the gold, platinum, antimony, and variable quantities of peroxide of silver, are precipitated at the anode, from which they are continually removed, and are caught and retained in the bags surrounding the anodes. To carry out this operation, the brush arrangement described in my application of February 5, 1884, is very effective. The brushes remove continually the silver from the cathodes, and prevent thereby the forming of so-called "bridges" or "connections" between the electrodes, and avoid the dropping of silver in the anode or gold-bag. Therefore the electrodes can be brought very near to each other, whereby the resistance of the cell is considerably diminished. The peroxides formed and precipitated at the anodes form in the course of time a thick layer on the same. As they are bad conductors of electricity and produce secondary currents or polarization in the battery, they would involve a considerable weakening or wastage of the current if they were not removed from the anodes by the brushes and collected in the bag provided therefor. In the present process, only one exciting-liquid is used, and there is no need of a dialyser—such as a porous cell, membrane, &c.—to keep the exciting-liquid of the anode separated from that of the cathode. In consequence the bag described serves only as a receptacle for the metals precipitated at the anode, and may be replaced by a box or other receiver placed under or around each anode. The only object of this arrangement is to keep the anions separate from the cations, and not to let both drop to the bottom of the tank. Consequently it is immaterial whether the anodes or the cathodes (or both) are provided with such a box or receptacle. For that reason I do not limit myself in this respect to any special arrangement in carrying out my process.

As described in my aforesaid application for a patent, the frame supporting the bag surrounding each anode is blackleaded, and thereby made a conductor of electricity. The anions brushed from the anodes fall and lie on the bottom of this frame, and if a contact of the latter with the anode-supporter is established the current will act upon the anions, whereby remnants of peroxide and of metallic silver and copper, which may be still present, are dissolved and extracted. This extraction will be more effective if the exciting-liquid contains a larger amount of nitric acid. The antimony, lead, as peroxide of lead, and other impurities contained in the silver, remain with the gold, from which they are separated by melting, and the peroxide of lead is thus changed into oxide of lead, and all oxidizable metals are converted into slags, leaving the pure gold; but if it is desired to obtain an absolutely pure gold devoid of platinum and platinum metals, which are to be separated from it, the following method may be used: The washed contents of the gold-bags are placed in a retort containing bromine-water having a surplus of bromine. The bromine-water may advantageously contain hydrobromic acid, which is easily obtained by exposing the bromine-water to the sunlight for some time. The retort is connected with a receiver which is filled with iron shavings and some water. The gold, peroxides, &c., are converted into bromides. The surplus of bromine is distilled into a receiver, where, with the iron, it forms bromide of iron, which is dissolved in the water contained in the receiver. After diluting the gold solution with cold water it is drawn from the retort into a tank, where the gold is precipitated by the bromide of iron formed in the receiver. The solution, which still contains platinum metals, &c., is then drawn off into another tank, in which plates of iron are suspended, by which platinum metals, lead, copper, &c., are precipitated. The separation of these metals is then continued by the well-known method. The remaining solution, which is devoid of all valuable metals, is evaporated from the salt obtained, consisting principally of perbromide of iron. The bromine and hydrobromic acid employed in the process are easily regenerated by treatment with sulphuric acid. If the silver contains osmi-iridium, it remains with the residuum in the retort, the residuum, consisting, principally, of bromide of lead and bromide of silver, is reduced by contact with zinc, and bromide of zinc results, which can be used for the regeneration of bromine also. The operation of regeneration is carried out in such a manner that the bromine and hydrobromic acid are distilled directly into the retort containing the contents of the gold-bags, and handling of the bromine and the unpleasant effects of its fumes will be so avoided. If in the course of time the exciting-liquid in the battery becomes too concentrated, and contains too much copper and not enough silver, copper will be precipitated with the silver, and if this occurs the solution needs to be regenerated in the following way: After removing all electrode and anode bags, copper plates or blocks are hung in the cell, whereby the silver remaining in the solution will be precipitated in a short time, since the brushes remove continuously the silver deposited in a loose state on the copper plates, and a clean surface of the latter is always exposed. After having removed the bags surrounding all electrodes, with the precipitated silver therein, the greater part of the copper in solution is precipitated by means of a current having a greater electromotive force, carbon plates being used as anodes and copper as cathodes. The density of the current and nature of the exciting-liquid affects considerably the quality of the copper liberated at the cathode, and to obtain it in a reguline coherent shape it would require either a very large surface of electrode or a weaker current. This would make the plan expensive or delay the precipitation too much. Therefore I prefer to use a strong current with ordinary size of electrode, and precipitate the copper as a loose powder at the cathode, whence it is dislodged continuously. As the anode is indissoluble the solution becomes more and more acid, and this free nitric acid would redissolve that fine copper precipitate dropped to the bottom of the tank, and so frustrate the whole operation. To prevent this I place under the electrode and on the bottom of the tank a large copper plate or box, and bring it by means of wires or rods in contact with the cathode-conductors. By this expedient the precipitated copper falls on this plate and forms with the same a part of the cathode, increasing its surface and preventing the redissolving of the copper. The brushes before referred to are also of great service during this operation, as they remove the bubbles of oxygen and hydrogen that accumulate on the electrodes, and thus prevent polarization and a waste of power. It will be advisable to use an anode-bag in this case also, in order to prevent the hydrogen bubbles arising from the plate below the electrodes from mixing with the oxygen bubbles at the anode. The solution remaining in the bath, and now containing much free nitric acid, is used in the process again, partly for replacing the water evaporated from the tanks and keeping the exciting-liquid sufficiently acidulated, and partly for making new baths, mixing it with a solution that contains already enough silver. By agitating the exciting-liquid in the different operations the formation of layers of different specific gravities and their bad effects is avoided. By heating the exciting-liquid its resistance is decreased and decomposition and precipitation greatly facilitated and accelerated. If the copper in the alloy amounts to more than about one-third of the silver, the nitrate of silver in the exciting-liquid will be converted into nitrate of copper too rapidly, and then the effective separation of the silver from the copper, gold, &c., in one operation is no longer practicable. The following preliminary treatment must then be employed for first extracting the copper from the alloy: The exciting-liquid used in this case consists of an acidulated solution of nitrate of copper. Instead of this, sulphate of copper may be used, if the alloy is poor in silver. The anodes are formed of blocks or plates of the alloy and the cathodes of copper plates. The electric current, which must be of small electro-motive force, then dissolves the copper and precipitates it at the cathode, silver, gold, platinum, lead, &c., remaining at the anode in a more or less coherent state, according to the composition of the alloy. The silver accumulating at the anodes will finally preponderate there in such a way that it would go into the solution also and be precipitated with the copper if it were not continually removed, together with the gold, &c., from the anode by the brushes, and thus be withdrawn from the dissolving action of the current. The silver, gold, platinum, &c., gathered in the bags are heated and cast into plates to be used as anodes, and the metals are then separated, as hereinbefore described.

The principal advantages of my improved process are as follows: The operation is continuous and very simple. A large quantity of silver can be refined very rapidly and at a very low cost, as the quantity of chemicals used is insignificant. There is no need of filtering and transferring or handling acids producing noxious or dangerous gases. The gold and silver obtained are very pure. All the platinum metals contained in the gold and silver can be recovered, and copper is obtained as pure metallic copper.

I am well aware that the use of bromine for the extracting of gold is old, and therefore do not claim that.

Having thus described my invention, what I claim as new is—

1. The herein-described method of refining silver by electrolysis, consisting in subjecting the alloy as anode to an electric current of small electro-motive force in a bath consisting of nitrate of silver, nitrate of copper, and nitric acid, and precipitating the silver at the cathode in a loose, spongy, or crystalline state, leaving the copper in solution, and metallic gold, platinum, antimony, and all lead, as peroxide of lead, at the anode, and preventing the anions and cations from being mixed with each other by receptacles placed under or around the electrodes, substantially as described.

2. The herein-described method of refining silver by electrolysis, which consists in subjecting the alloy as anode to an electric current in a bath of nitrate of silver, nitrate of copper, and nitric acid, and precipitating the silver at the cathodes, leaving the copper in solution, and gold, platinum, lead, &c., at the anodes, and subjecting the electrodes to a continuous brushing or scraping, whereby anions and cations are removed from the same, and a complete separation of the metals is effected, substantially as set forth.

3. The herein-described method of refining base bullion that contains more than about one-third of copper, which consists in subjecting the alloy as anodes to an electric current in a bath of nitrate or sulphate of copper, and precipitating the copper at the cathodes, leaving the gold, silver, lead, &c., at the anodes, and subjecting the same during the action of the current to a continuous brushing or scraping, whereby the silver, gold, lead, &c., are removed from the anodes and dissolving action of the current, whereby a simultaneous precipitation of silver with the copper is prevented and the decomposition of the alloy greatly accelerated, substantially as herein shown and described.

4. The herein-described method of facilitating and accelerating the precipitation of metals in solution by immersion of a precipitant metal, which method consists in subjecting the precipitant metal to a continuous scraping of brushes or scrapers acting on the said precipitant metal during the time the same is in solution, substantially as herein shown and described.

5. The herein-described method of separating the gold from mixtures of metals, which consists in dissolving the gold in a closed vessel by a solution of bromine and hydrobromic acid, and distilling the surplus of bromine into a receiver filled with iron shavings, whereby bromide of iron is formed, that can be used for precipitating the gold in the solution drawn from the vessel, substantially as herein shown and described, and whereby also handling of liquids producing noxious gases is avoided, and the bromine and hydrobromic acid can be regenerated with facility, as set forth.

6. The herein-described method of precipitating copper or other metal in a loose state by an electric current at the cathode, which consists in using an indissolvable metal or carbon as anode, and catching the metal dropping from the cathode on or in a conductive plate or box placed under the electrodes, and connected with the cathode-conductors, whereby a redissolving of the precipitated metal in the exciting-liquid is prevented, substantially as herein shown and described.

BERNARD MOEBIUS.

Witnesses:
CHAS. A. PETTIT,
EDWD. W. BYRN.